(12) United States Patent
Kato

(10) Patent No.: US 7,793,567 B2
(45) Date of Patent: Sep. 14, 2010

(54) CLAMPING DEVICE AND ROTARY TABLE APPARATUS

(75) Inventor: Heizaburo Kato, Ogasa-Gun (JP)

(73) Assignee: Sankyo Seisakusho Co., Tokyo (JP)

( * ) Notice: Subject to any disclaimer, the term of this patent is extended or adjusted under 35 U.S.C. 154(b) by 0 days.

(21) Appl. No.: 11/806,644

(22) Filed: Jun. 1, 2007

(65) Prior Publication Data

US 2007/0234849 A1    Oct. 11, 2007

Related U.S. Application Data

(62) Division of application No. 10/956,334, filed on Oct. 4, 2004, now abandoned.

(30) Foreign Application Priority Data

Oct. 17, 2003    (JP) ............................. 2003-357306

(51) Int. Cl.
    *B23B 29/24*    (2006.01)
    *F16H 1/16*    (2006.01)
(52) U.S. Cl. .................... 74/813 L; 74/425; 303/89
(58) Field of Classification Search .............. 74/490.07, 74/490.08, 425, 813 L; 303/89; 188/315, 188/322.21, 352, 353; 464/182
    See application file for complete search history.

(56) References Cited

U.S. PATENT DOCUMENTS

| | | | |
|---|---|---|---|
| 3,362,733 A | | 1/1968 | Klara |
| 3,663,027 A | * | 5/1972 | Klipping .................... 279/4.03 |
| 4,264,229 A | | 4/1981 | Falk |
| 4,896,560 A | * | 1/1990 | Kato ............................. 74/569 |
| 5,157,292 A | * | 10/1992 | Morrill ......................... 310/42 |
| 5,234,081 A | * | 8/1993 | Watanabe ..................... 188/74 |
| 5,855,446 A | * | 1/1999 | Disborg ........................ 403/31 |
| 6,324,943 B1 | * | 12/2001 | Sahara ....................... 74/813 R |
| 6,669,416 B2 | * | 12/2003 | Klement ...................... 409/201 |
| 6,862,786 B2 | * | 3/2005 | Kato .............................. 29/43 |
| 2002/0138959 A1 | | 10/2002 | Kato | |

FOREIGN PATENT DOCUMENTS

| | | |
|---|---|---|
| EP | 0242346 A | 10/1987 |
| EP | 0394694 A | 10/1990 |
| EP | 1201353 A | 5/2002 |
| JP | 47-15272 | 10/1972 |
| JP | 3-36730 | 4/1991 |
| JP | 5-6005 | 2/1993 |
| JP | 8-118116 | 5/1996 |
| JP | 3067068 | 12/1999 |
| JP | 2002-103181 | 4/2002 |

(Continued)

OTHER PUBLICATIONS

European Search Report dated Mar. 2, 2005.

(Continued)

*Primary Examiner*—Thomas R Hannon
*Assistant Examiner*—James Pilkington
(74) *Attorney, Agent, or Firm*—Morrison & Foerster LLP

(57) ABSTRACT

A clamping device for clamping a rotatably supported shaft, is provided with a thin-walled sleeve arranged such that a gap is provided along a circumferential direction of the shaft. The clamping device clamps the shaft by deforming the thin-walled sleeve towards the shaft.

5 Claims, 14 Drawing Sheets

FOREIGN PATENT DOCUMENTS

JP          2002-126958          5/2002

OTHER PUBLICATIONS

European Office Action mailed Feb. 8, 2006, directed to counterpart EP Application No. 04256197.7.

Chinese Office Action dated Oct. 26, 2007, directed to counterpart Chinese Application No. 200410092161.4 (9 pages).

Chinese Office Action dated May 16, 2008 directed to counterpart CN Application No. 200410092161.4 (10 pages).

Chinese Office Action, dated Aug. 29, 2008, directed to counterpart Chinese Patent Application No. 200410092161.4; 15 pages.

Chinese Office Action mailed on Dec. 12, 2008 directed at counterpart application No. 2004100921614; 6 pages.

Japanese Office Action, mailed Jun. 16, 2009 directed to Japanese Patent Application No. 2003-357306; 5 pages (including English translation).

Chinese Rejection Decision dated Dec. 4, 2009, directed towards counterpart Chinese Application No. 200410092161.4; 13 pages.

Kato, H. U.S. Office Action mailed Jan. 8, 2007, directed to U.S. Appl. No. 10/956,334; 7 pages.

Japanese Notification of Reasons for Rejection mailed on Mar. 23, 2010, directed to counterpart Japanese Patent Application No. 2003-357306; 7 pages.

* cited by examiner

CLAMPING DEVICE AND ROTARY TABLE APPARATUS

CROSS-REFERENCE TO RELATED APPLICATIONS

This application is a divisional application of U.S. Ser. No. 10/956,334, filed Oct. 4, 2004, which claims priority upon Japanese Patent Application No. 2003-357306 filed Oct. 17, 2003, which is herein incorporated by reference.

BACKGROUND OF THE INVENTION

1. Field of the Invention

The present invention relates to clamping devices and rotary table apparatuses.

2. Description of the Related Art

Rotary table apparatuses used in machine tools or the like are already well known. Such rotary table apparatuses include a driven shaft that is rotationally driven by a driving section such as a motor, and a rotary table that is rotationally driven by this driven shaft and that holds a workpiece or the like. When the driven shaft is driven by the driving section, the driven shaft rotates, the rotational driving force of the driven shaft is transmitted to the rotary table, and the rotary table rotates around its rotation axis.

Such a rotary table apparatus further includes a clamping device for clamping the driven shaft, in order to realize such a function as to securely keep the rotary table still. When the driven shaft has been halted and the rotary table has been positioned, this clamping device clamps the driven shaft to, for example, perform work on the workpiece that is held by the rotary table. Thus, the rotary table can be reliably held still, and work can be performed on the workpiece with high precision. (See, for example, JP 2002-126958A).

The driven shaft is supported rotatably with respect to the housing by bearings or the like. There is, however, a possibility that misalignments may occur in the driven shaft. Examples of such misalignments are axial displacements in which the axis of the driven shaft is displaced from the desired axis, and angular inclinations in which the axial orientation of the driven shaft is inclined from the desired axial orientation. In these cases, there is a discrepancy between the relative positions of the driven shaft and the clamping device. Such a discrepancy in the relative positions may also occur when there are misalignments due to displacement or inclination of the clamping device, even when there is no misalignment of the driven shaft.

Consequently, there is a need for a clamping device that can properly clamp the driven shaft even in such a situation.

SUMMARY OF THE INVENTION

The present invention has been made in view of the above issues, and it is an object of the present invention to provide a clamping device and a rotary table apparatus, with which a rotatably supported shaft can be properly clamped, even when there is a misalignment of the shaft or the clamping device.

According to a main aspect of the present invention, a clamping device for clamping a rotatably supported shaft, comprises: a thin-walled sleeve arranged such that a gap is provided along a circumferential direction of the shaft; wherein the clamping device clamps the shaft by deforming the thin-walled sleeve towards the shaft.

Features and objects of the present invention other than the above will become clear by reading the description of the present specification with reference to the accompanying drawings.

BRIEF DESCRIPTION OF THE DRAWINGS

In order to facilitate further understanding of the present invention and the advantages thereof, reference is now made to the following description taken in conjunction with the accompanying drawings wherein.

DETAILED DESCRIPTION OF THE INVENTION

Figure 1:
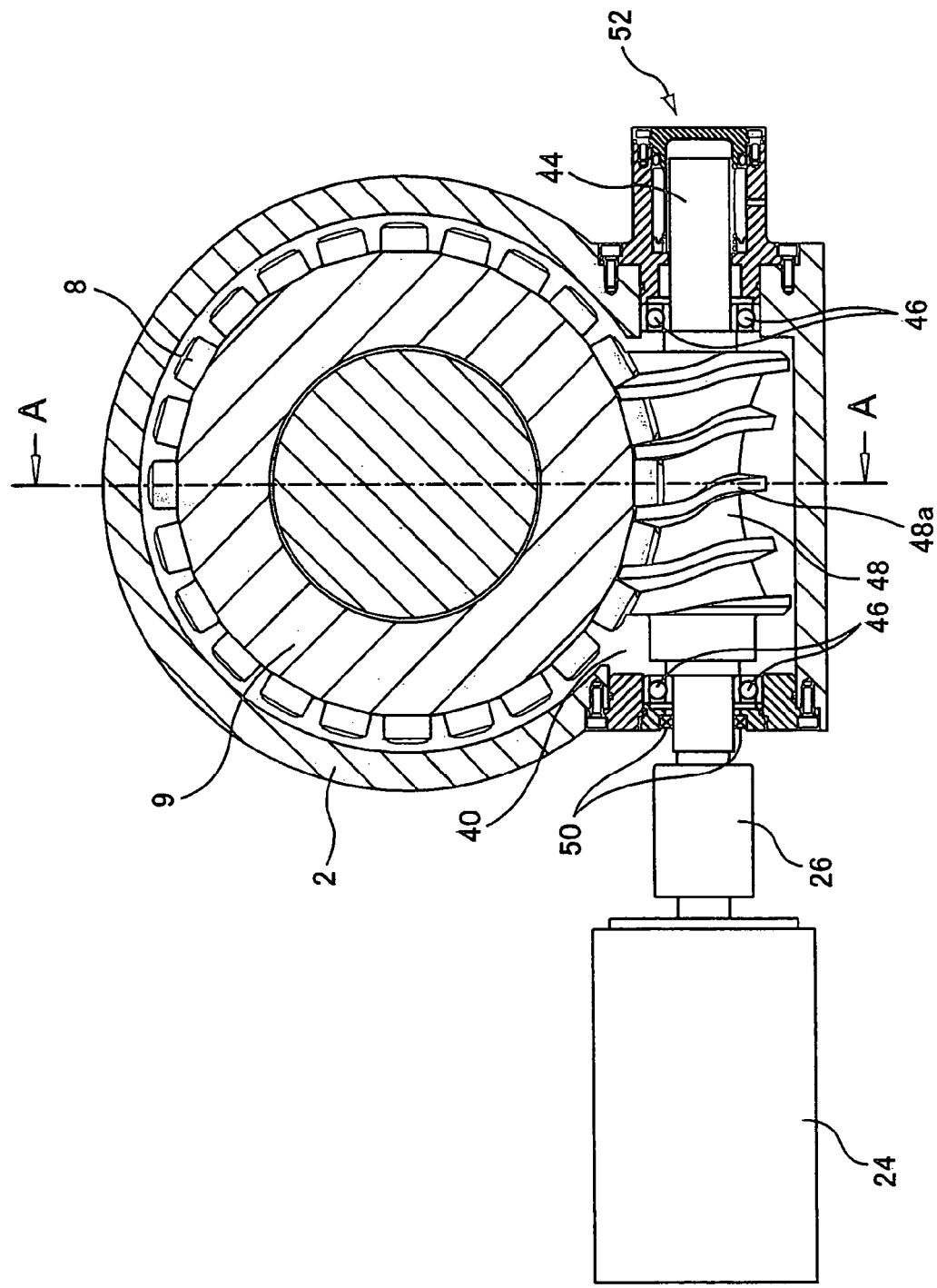
FIG. 1 shows a longitudinal section through a rotary table apparatus 10 according to an embodiment of the present invention.

At least the following matters will be made clear by the explanation in the present specification and the description of the accompanying drawings.

A clamping device for clamping a rotatably supported shaft, comprises: a thin-walled sleeve arranged such that a gap is provided along a circumferential direction of the shaft; wherein the clamping device clamps the shaft by deforming the thin-walled sleeve towards the shaft.

With such a clamping device, a rotatably supported shaft can be properly clamped even when there is a misalignment of the shaft or the clamping device.

Further, a thickness of the thin-walled sleeve may be 5 mm or less.

With such a clamping device, the rotatably supported shaft can be clamped more properly, even when there is a misalignment of the shaft or the clamping device.

Further, the clamping device may clamp the shaft by deforming the thin-walled sleeve such that the thin-walled sleeve adapts to the shape of a circumferential surface of the shaft.

With such a clamping device, the rotatably supported shaft can be clamped more properly even when there is a misalignment of the shaft or the shaft or the clamping device, because when the thin-walled sleeve is deformed, it adapts to the shape of the circumferential surface of the shaft.

Further, the thin-walled sleeve may be positioned on an outer side in a radial direction of the shaft; and the clamping device may clamp the shaft by deforming the thin-walled sleeve from the outer side in the radial direction towards the shaft.

Thus, the configuration becomes simple.

The clamping device may further comprise a fluid containing section for containing a fluid, the fluid containing section being arranged on the outer side in the radial direction with respect to the thin-walled sleeve; wherein the clamping device may deform the thin-walled sleeve by a pressure of the fluid that is filled into the fluid containing section.

Thus, the thin-walled sleeve can be deformed according to a simple method.

Further, the thin-walled sleeve may be arranged only on an inner side in the radial direction of the shaft with respect to the fluid containing section.

If, for example, the thin-walled sleeve is provided both on the inner side and on the outer side in the radial direction of the driven shaft with respect to the fluid containing section, then the effect of the pressure of the fluid in the fluid containing section, that is, the effect of the pressure deforming the thin-walled sleeve will be distributed between the thin-walled sleeve arranged radially inward and the thin-walled sleeve arranged radially outward. On the other hand, if the thin-walled sleeve is provided only on the inner side in the radial direction of the driven shaft with respect to the fluid containing section, then the effect of the pressure is concentrated on that thin-walled sleeve, and thus, the thin-walled sleeve can be efficiently deformed.

Also provided is a rotary table apparatus comprising: a driven shaft that is rotationally driven by a driving section; a rotary table that is rotationally driven by the driven shaft; and a clamping device for clamping the driven shaft; wherein the clamping device includes a thin-walled sleeve arranged such that a gap is provided along a circumferential direction of the driven shaft; and wherein the clamping device clamps the driven shaft by deforming the thin-walled sleeve towards the driven shaft.

With such a rotary table apparatus, the driven shaft can be properly clamped even when there is a misalignment of the driven shaft or the clamping device.

Further, a thickness of the thin-walled sleeve may be 5 mm or less.

With such a rotary table apparatus, the driven shaft can be clamped more properly, even when there is a misalignment of the driven shaft or the clamping device.

Further, the driven shaft may have a cam; the rotary table may have a cam follower; and the rotary table may be rotationally driven by the driven shaft using the cam and the cam follower.

With such a rotary table apparatus, the driven shaft, which rotationally drives the rotary table using a cam and a cam follower, can be clamped more properly, even when there is a misalignment of the driven shaft or the clamping device.

Further, the rotary table apparatus does not have to be provided with a dwelling period in which the rotary table is not rotationally driven even though the driven shaft is being rotationally driven.

In this case, the driven shaft will always be standing still when the rotary table is positioned and standing still. Therefore, the importance of the clamping device for securely holding the rotary table still by clamping the driven shaft increases. Consequently, the above-noted effect, that is, the effect that it is possible to properly clamp the driven shaft even when there is a misalignment of the driven shaft or the clamping device, can be achieved more appropriately.

Further, the clamping device may clamp the driven shaft by deforming the thin-walled sleeve such that the thin-walled sleeve adapts to the shape of a circumferential surface of the driven shaft.

With such a rotary table apparatus, it is possible to clamp the driven shaft more properly even when there is a misalignment of the driven shaft or the clamping device, because when the thin-walled sleeve is deformed, it adapts to the shape of the circumferential surface of the driven shaft.

Further, the thin-walled sleeve may be positioned on an outer side in a radial direction of the driven shaft; and the clamping device may clamp the driven shaft by deforming the thin-walled sleeve from the outer side in the radial direction towards the driven shaft.

Thus, the configuration becomes simple.

Further, the clamping device may further comprise a fluid containing section for containing a fluid, the fluid containing section being arranged on the outer side in the radial direction with respect to the thin-walled sleeve; and the clamping device may deform the thin-walled sleeve by a pressure of the fluid that is filled into the fluid containing section.

Thus, the thin-walled sleeve can be deformed according to a simple method.

Further, the thin-walled sleeve may be arranged only on an inner side in the radial direction of the driven shaft with respect to the fluid containing section.

If, for example, the thin-walled sleeve is provided both on the inner side and on the outer side in the radial direction of the driven shaft with respect to the fluid containing section, then the effect of the pressure of the fluid in the fluid containing section, that is, the effect of the pressure deforming the thin-walled sleeve will be distributed between the thin-walled sleeve arranged radially inward and the thin-walled sleeve arranged radially outward. On the other hand, if the thin-walled sleeve is provided only on the inner side in the radial direction of the driven shaft with respect to the fluid containing section, then the effect of the pressure is concentrated on that thin-walled sleeve, and thus, the thin-walled sleeve can be efficiently deformed.

Further, the gap may include an oil; and a surface of the driven shaft may be provided with a groove into which the oil flows when the clamping device clamps the driven shaft by deforming the thin-walled sleeve towards the driven shaft.

When the driven shaft is clamped and a large rotation load is exerted on the driven shaft, there is a possibility that the driven shaft and the thin-walled sleeve may get locked due to the friction heat occurring between the driven shaft and the thin-walled sleeve. The oil achieves the function of preventing the occurrence of such locking in the event that a large rotation load is exerted on the driven shaft. However, in ordinary situations, due to the effect of the oil provided in the gap, the driven shaft and the thin-walled sleeve are prone to slide against each other, and thus, there is the problem that a sufficient clamping capability cannot be attained. By providing grooves in the surface of the driven shaft, the oil in the gap flows into the grooves when the thin-walled sleeve clamps the driven shaft, and slippage between the driven shaft and the thin-walled sleeve is prevented, thus solving the above-noted problem.

Configuration Example of Rotary Table Apparatus

Figure 2:
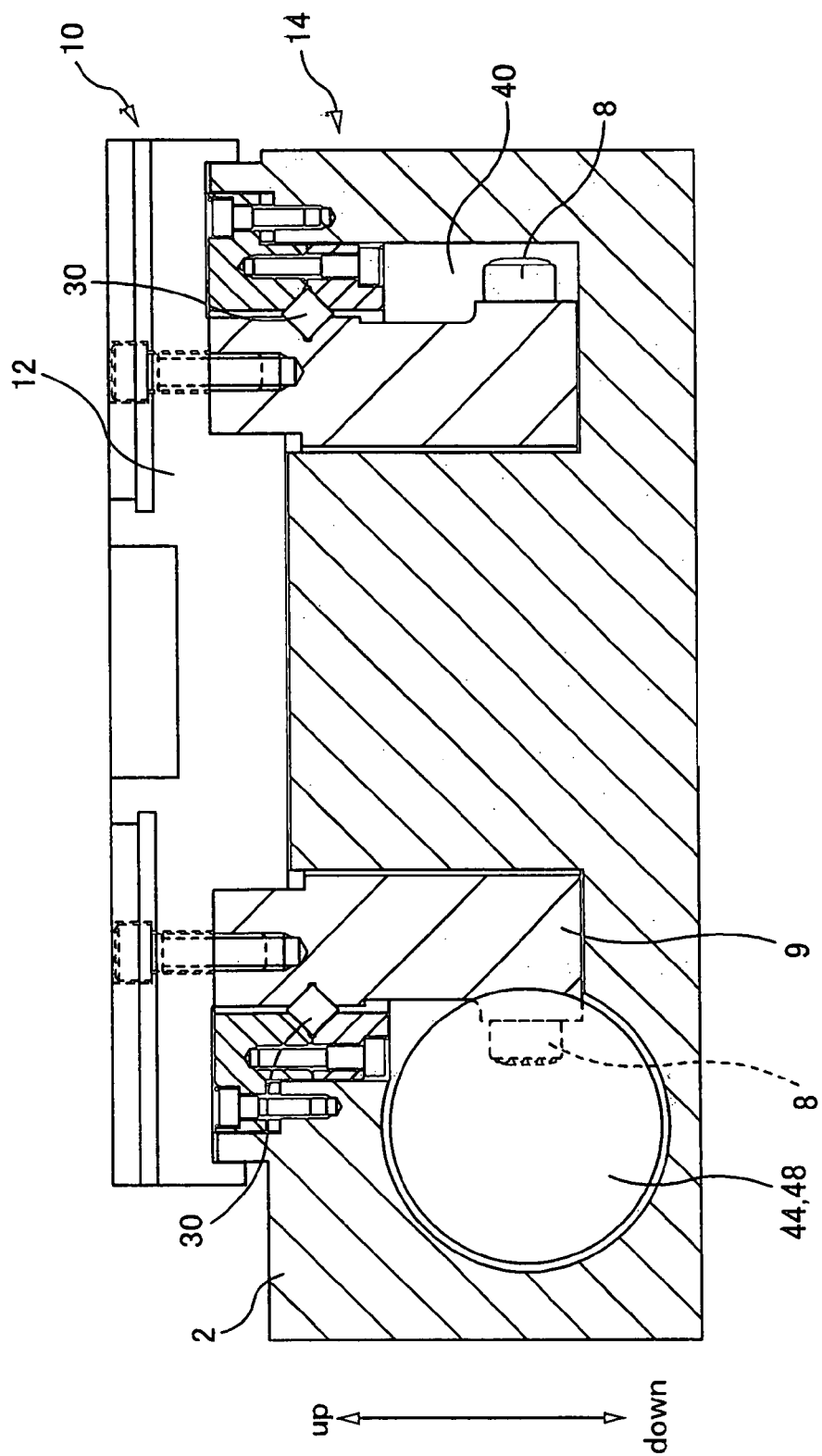
FIG. 2 shows a section along A-A in FIG. 1.

The following is an explanation of a configuration example of a rotary table apparatus 10, with reference to FIGS. 1 and 2. FIG. 1 shows a longitudinal section through a rotary table apparatus 10 according to an embodiment of the present invention. FIG. 2 shows a section along A-A in FIG. 1. It should be noted that in FIG. 2, the vertical direction is indicated by arrows, and a rotary table 12 is arranged above cam followers 8, for example.

The rotary table apparatus 10 is provided with a motor 24, which is an example of a driving section, a driven shaft 44 that is rotationally driven by the motor 24, a rotary table 12 that is rotationally driven by the driven shaft 44, a support base 14 that rotatably supports the rotary table 12, and a clamping device 52 for clamping the driven shaft 44.

The driven shaft 44 is supported by a pair of ball bearings 46, such that it is freely rotatable with respect to a housing 2. The motor 24 is fastened via a fastening member 26 to one end in the axial direction of the driven shaft 44. The driven shaft 44 is rotationally driven by the driving force of the motor 24. The driven shaft 44 is provided with a roller gear cam 48, which is an example of a cam. The roller gear cam 48 has a cam surface 48a whose phase is displaced in the axial direction as the driven shaft 44 rotates. Here, a globoidal cam in which backlash occurs neither during standstill nor during indexing is used as the roller gear cam 48.

The rotary table 12 has the role of holding the workpiece. This rotary table 12 is held by a pair of cross roller bearings 30 such that it is freely rotatable with respect to the support base 14. A cylindrical turret 9 is suspended from the lower-surface side of the rotary table 12, and a plurality of cam followers 8 that are arranged equidistantly in the circumferential direction are provided at the bottom of the outer circumferential surface of the turret 9. These cam followers 8 mesh with the above-described cam surface 48a of the roller gear cam 48, such that the rotational force of the driven shaft 44 is transmitted via the roller gear cam 48 and the cam followers 8 to the rotary table 12. That is to say, using the roller gear cam 48 and the cam followers 8, the rotary table 12 is rotationally driven by the driven shaft 44.

The clamping device 52 is for clamping the driven shaft 44 that is supported rotatably. The clamping device 52 is screwed with screws 42 to the housing 2 (see FIG. 3). The configuration of the clamping device 52 is explained in more detail further below.

It should be noted that in this embodiment, the shape of the cam surface 48a etc. is designed such that no dwelling period occurs, in other words, such that no period occurs in which the driven shaft 44 is rotationally driven but the rotary table 12 is not rotationally driven. Moreover, oil for lubricating the roller gear cam 48 and the cam followers 8 is provided in a gap portion 40 within the housing 2. Leakage of the oil to the outside of the rotary table apparatus 10 is prevented by a sealing member 50 or the like.

The following is an explanation of the operation of the rotary table apparatus 10 which is structured as above.

When the driven shaft 44 is driven by the motor 24, the driven shaft 44 rotates with respect to the housing 2. When the driven shaft 44 rotates, also the roller gear cam 48 rotates, and the cam followers 8 meshing therewith engage the cam surface 48a one after the other, so that the rotational driving force is transmitted to the rotation table 12 and the rotary table 12 rotates around the rotation axis of the turret 9. Moreover, when the rotary table 12 has been positioned (for example, when working on a workpiece that is held by the rotary table 12), the driven shaft 44 is clamped by the clamping device 52.

About the Clamping Device 52

Figure 3:
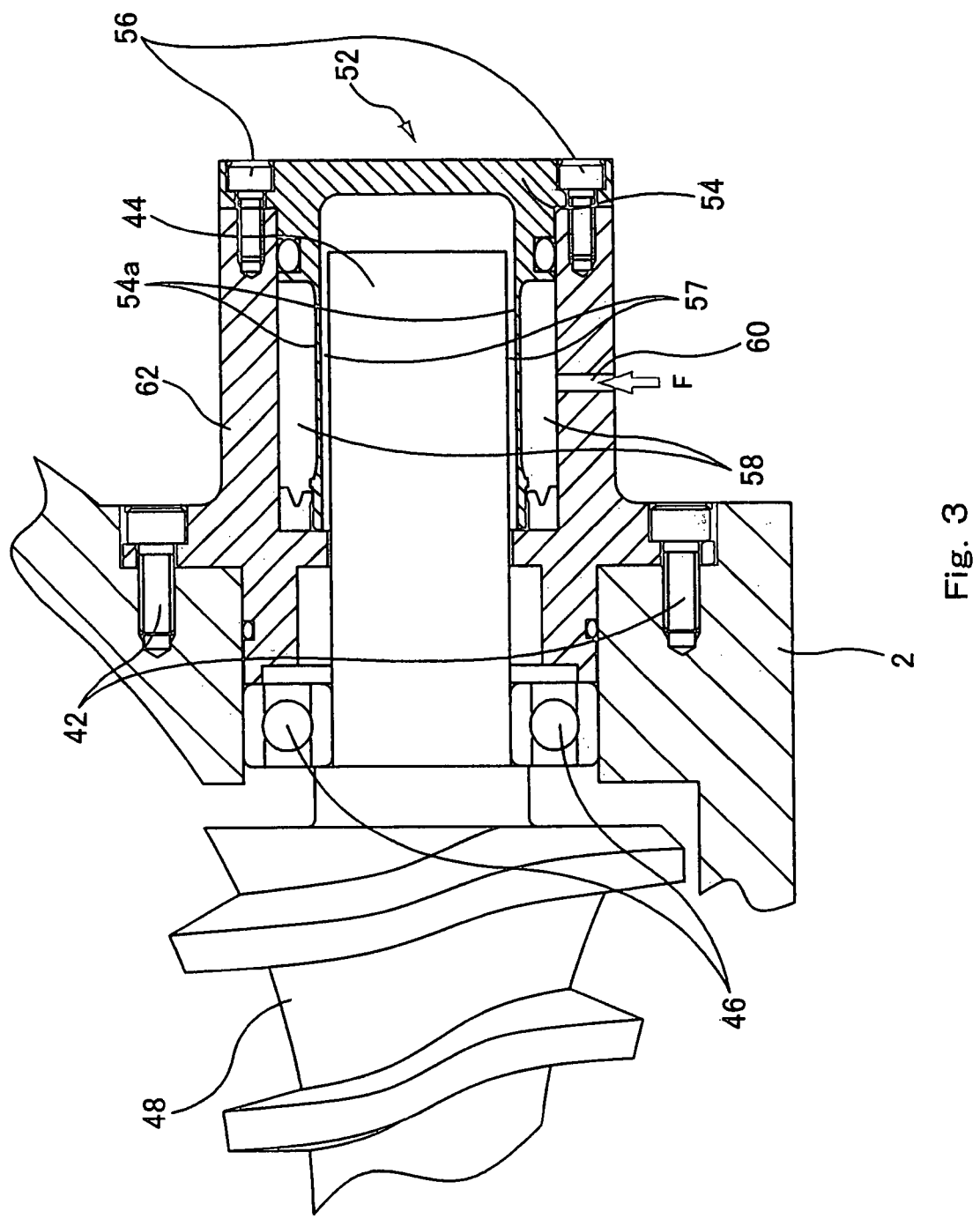
FIG. 3 is a magnified view of the clamping device 52.
Figure 4A:
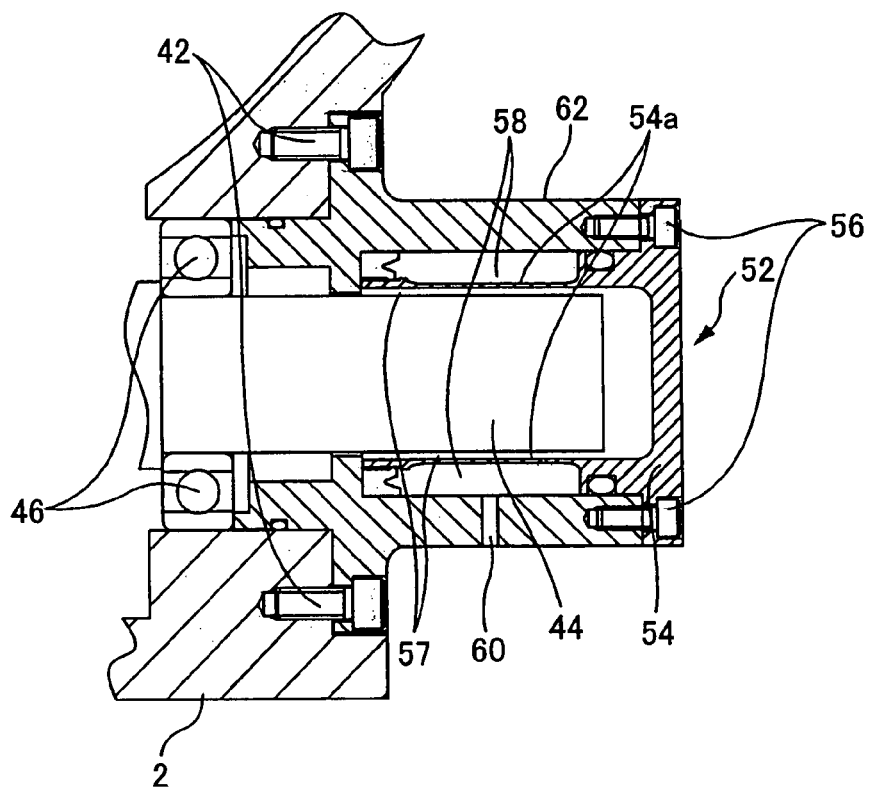
FIGS. 4A and 4B are diagrams illustrating the operation of the clamping device 52.
Figure 4B:
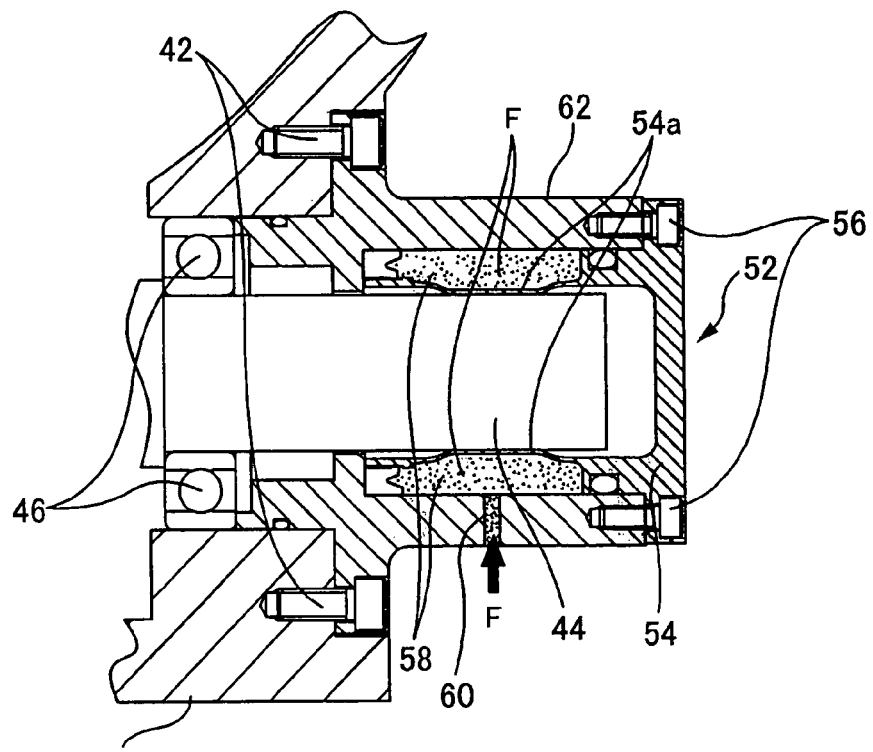

The following is an explanation of a configuration example and an operation example of the clamping device 52, with reference to FIGS. 3, 4A and 4B. FIG. 3 is a magnified view of the clamping device 52. FIGS. 4A and 4B are diagrams illustrating the operation of the clamping device 52.

Configuration Example of Clamping Device 52

First, a configuration example of the clamping device 52 is explained with reference to FIG. 3.

The clamping device 52 includes, for example, a clamper 54, a thin-walled sleeve 54a, a fluid containing section 58, a fluid filling port 60, and a casing 62.

The clamper 54 clamps the driven shaft 44 by deformation towards the driven shaft 44. The damper 54 is provided with a thin-walled sleeve 54a (described below), and is screwed with screws 56 to the casing 62.

The thin-walled sleeve 54a is a thin-walled member made of metal having a hollow cylindrical shape, and is not more than 5 mm thick. This thin-walled sleeve 54a is arranged along the circumferential direction of the driven shaft 44, such that a gap 57 is provided on the radially outer side of the driven shaft 44. Moreover, the thin-walled sleeve 54a is so thin that it can be deformed. That is to say, the thin-walled sleeve 54a can be deformed from the outer side, in the radial direction, of the driven shaft 44 toward the driven shaft 44. When deforming, the thin-walled sleeve 54a adapts to the shape of the circumferential surface of the driven shaft 44, so that the driven shaft 44 can be clamped securely. It should be noted that the thin-walled sleeve 54a is provided only on the inner side in the radial direction of the driven shaft 44 with respect to the fluid containing section 58 (explained below), and is not provided on the outer side etc. in the radial direction of the driven shaft 44 with respect to the fluid containing section 58.

The fluid containing section 58 is arranged adjacent to the thin-walled sleeve 54a, on the outer side in the radial direction of the driven shaft 44 with respect to the thin-walled sleeve 54a. This fluid containing section 58 can contain a fluid F, for example, a liquid such as water or oil, or a gas such as air. The pressure of the fluid F that is filled into the fluid containing section 58 deforms the thin-walled sleeve 54a adjacent to the fluid containing section 58, whereby the driven shaft 44 is clamped.

The casing 62 has the function to contain the clamper 54 etc. This casing 62 is arranged adjacent to the fluid containing section 58, on the outer side in the radial direction of the driven shaft 44 with respect to the fluid containing section 58. As explained above, the clamper 54 is screwed to this casing 62. Moreover, the casing 62 is provided with a fluid filling port 60 for filling the fluid F into the fluid containing section 58. The fluid F is filled from a fluid transmission device (not shown in the drawings) via the fluid filling port 60 into the fluid containing section 58.

Operation Example of the Clamping Device 52

The following is an explanation of an operation example of the clamping device 52, with reference to FIGS. 4A and 4B. FIG. 4A is a sectional view showing the state of the driven shaft 44 and the clamping device 52 when the clamping device 52 is not clamping the driven shaft 44. FIG. 4B is a sectional view showing the state of the driven shaft 44 and the clamping device 52 when the clamping device 52 is clamping the driven shaft 44.

As described above, when the driven shaft 44 is driven by the motor 24, the driven shaft 44 rotates with respect to the housing 2, and the rotational driving force from this rotation is transmitted to the rotary table 12, thereby rotating the rotary table 12 around the rotation axis of the turret 9. In this situation, clamping with the clamping device 52 is not performed, so as not to hinder the rotation of the driven shaft 44. That is to say, when the driven shaft 44 rotates, the clamping device 52 is maintained in the state shown in FIG. 4A.

Then, when the driven shaft 44 is halted and the rotary table 12 has been positioned, the clamping device 52 operates as follows, in order to clamp the driven shaft 44 (see FIG. 4B).

First, the fluid F is filled from a fluid transmission device (not shown in the drawings) through the fluid filling port 60 into the fluid containing section 58. The fluid F that has been filled into the fluid containing section 58 exerts a pressure on the thin-walled sleeve 54 adjacent to the fluid containing section 58, and this pressure of the fluid F deforms the thin-walled sleeve 54a from the outer side in the radial direction of the driven shaft 44 towards the driven shaft 44. That is to say, the gap 57 (see FIG. 4A), which is located between the thin-walled sleeve 54a and the driven shaft 44 before the fluid F is filled into the containing portion 58, disappears due to the deformation of the thin-walled sleeve 54a (see FIG. 4B), and the thin-walled sleeve 54a adapts to the shape of the circumferential surface of the driven shaft 44. Then, the thin-walled sleeve 54a presses against the driven shaft 44, thereby clamping the driven shaft 44. When the driven shaft 44 is clamped in this manner, the positioned rotary table 12 is reliably held still. Consequently, if the workpiece is worked on in this situation, then it is possible to work on the workpiece with high precision.

Then, when the rotary table apparatus 10 is to rotate the rotary table 12 again, the clamping of the driven shaft 44 by the clamping device 52 is released through the following operation.

First, the fluid F is discharged from the fluid containing section 58. By discharging the fluid F, the pressure exerted on the thin-walled sleeve 54a is lowered, and the thin-walled sleeve 54a is deformed and returned from the state shown in FIG. 4B to the state shown in FIG. 4A. That is to say, the gap 57 that was not present in the state shown in FIG. 4B reappears as shown in FIG. 4A, so that the clamping of the driven shaft 44 is released. When the clamping of the driven shaft 44 is released, the driven shaft 44 can be rotationally driven by the motor 24 without hindrance, and the rotary table 12 can be appropriately rotated.

About the Effectiveness of the Clamping Device 52 According to the Present Embodiment with Regard to a Misaligned Driven Shaft 44

As described above, the clamping device 52 according to the present embodiment includes a thin-walled sleeve 54a that is provided such that there is a gap 57 along the circumferential direction of the driven shaft 44, and the driven shaft 44 is clamped by deforming the thin-walled sleeve 54a towards the driven shaft 44. Thus, even when there are misalignments in the driven shaft 44 and/or the clamping device 52, the driven shaft 44 can still be properly clamped.

Figure 5A:
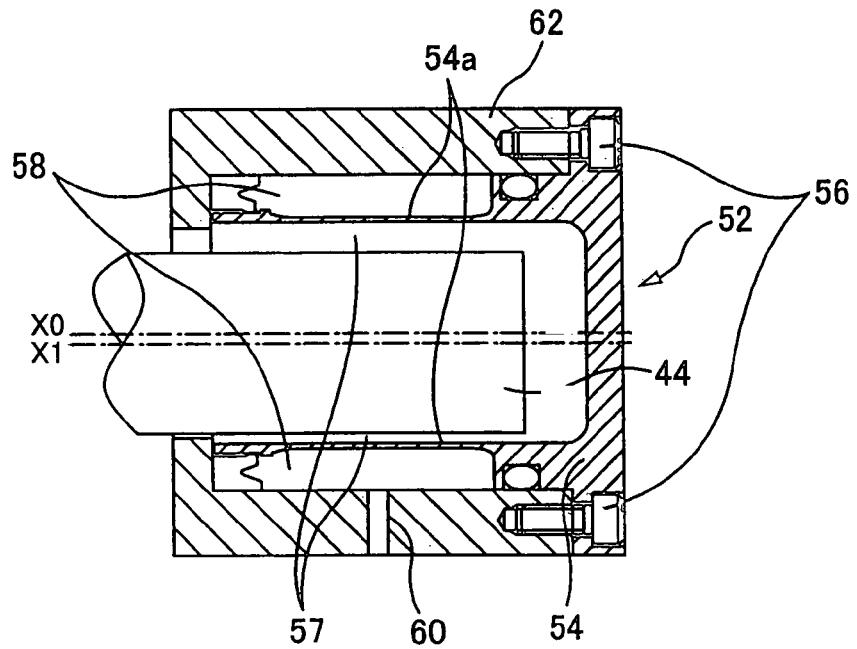
FIGS. 5A and 5B are sectional views showing a state of the driven shaft 44 and the clamping device 52 when the driven shaft 44 is off center.
Figure 5B:
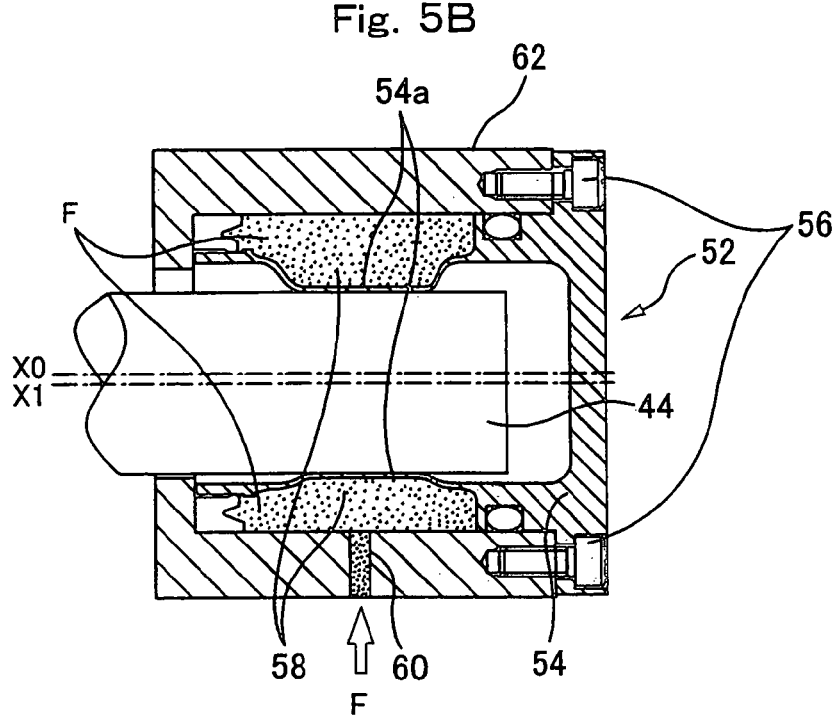
Figure 6A:
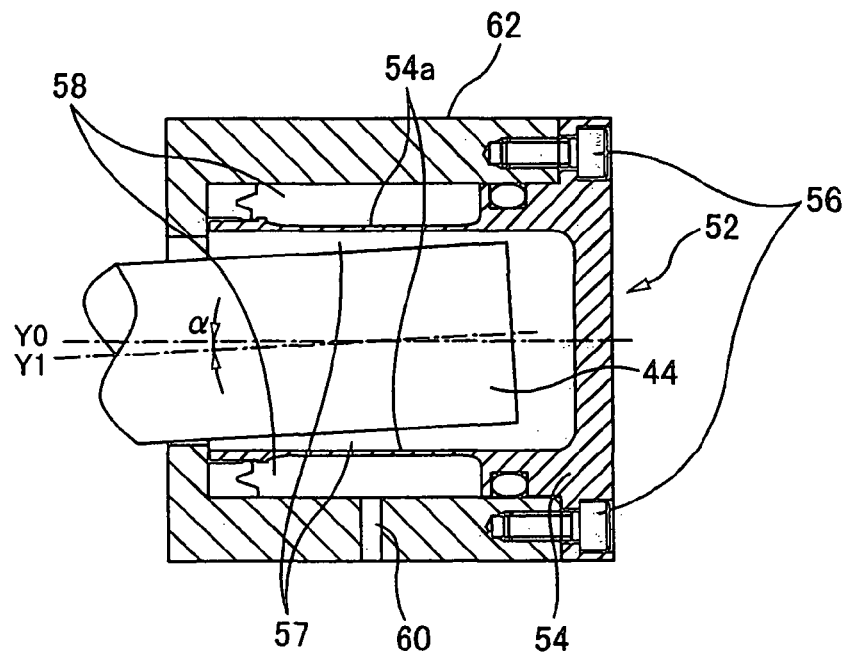
FIGS. 6A and 6B are sectional views showing a state of the driven shaft 44 and the clamping device 52 when the driven shaft 44 is inclined.
Figure 6B:
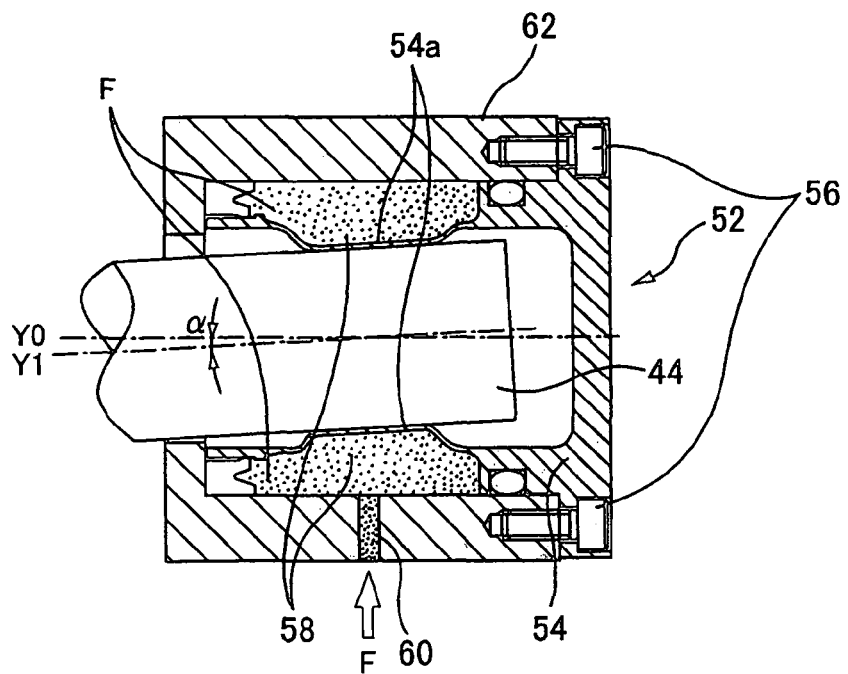

This aspect is explained with reference to FIGS. 5A to 6B. FIGS. 5A and 5B are sectional views showing the state of the driven shaft 44 and the clamping device 52 when the driven shaft 44 is off center. FIGS. 6A and 6B are sectional views showing the state of the driven shaft 44 and the clamping device 52 when the driven shaft 44 is inclined. FIGS. 5A and 6A show the state of the driven shaft 44 and the clamping device 52 when the driven shaft 44 is not clamped by the clamping device 52, whereas FIGS. 5B and 6B show the state of the driven shaft 44 and the clamping device 52 when the driven shaft 44 is clamped by the clamping device 52.

As explained in the section of the "Description of the Related Art", the driven shaft 44 is supported rotatably with respect to the housing 2 by the pair of ball bearings 46, but there is a possibility that misalignments may occur in the driven shaft 44. For example, as shown in FIG. 5A, an axial displacement may occur in which the axis (marked "X1" in the figure) of the driven shaft 44 is displaced from the desired axis (marked "X0" in the figure). Or, as shown in FIG. 6A, an angular inclination (marked "α" in the figure) may occur in which the axial orientation (marked "Y1" in the figure) of the driven shaft 44 is inclined from the desired axial orientation (marked "Y0" in the figure). In these cases, there is a discrepancy between the relative positions of the driven shaft 44 and the clamping device 52. Moreover, although not shown in the diagrams, such a discrepancy in the relative positions may also occur when there are misalignments due to displacement or inclination of the clamping device 52, even when there is no misalignment of the driven shaft 44. In view of the above, there is a need for a clamping device 52 that can properly clamp the driven shaft 44 even in these situations.

The clamping device 52 according to the present embodiment is provided with a thin-walled sleeve 54a that is arranged such that there is a gap 57 along the circumferential direction of the driven shaft 44, and the driven shaft 44 is clamped by deforming this thin-walled sleeve 54a towards the driven shaft 44. In this way, the above-mentioned need is fulfilled. That is to say, the clamping device 52 clamps the driven shaft 44 by deforming the thin-walled sleeve 54a, but the thin-walled sleeve 54a is so thin that its degree of freedom of deformation is very high. Consequently, even when there is a misalignment such as axial displacement or angular inclination of the driven shaft 44 as shown in FIGS. 5B and 6B, or if there is a misalignment such as axial displacement or angular inclination of the clamping device 52, the thin-walled sleeve 54a can easily adapt to the shape of the circumferential surface of the driven shaft 44, and thus, the driven shaft 44 is properly clamped in a state maintaining the misalignment, without suffering an inadequate load from the clamping device 52. It should be noted that in order to achieve the above-described effect, it is preferable that the thickness of the thin-walled sleeve 54a is 5 mm or less.

Other Embodiments

Above, a clamping device and a rotary table apparatus of the present invention were described with reference to an embodiment thereof, but the foregoing embodiment of the present invention is merely to facilitate the understanding of the present invention, and does not limit the present invention. Needless to say, changes and modifications of the present invention are possible without deviating from the spirit of the invention, and equivalents are intended to be embraced therein.

In the foregoing embodiment, an example was explained in which the rotary table apparatus 10 includes a driven shaft 44 that is rotationally driven by a driving section such as a motor 24, and a rotary table 12 that is rotationally driven by the driven shaft 44, and the above-explained clamping device 52 was applied to the driven shaft 44 of the rotary table apparatus 10 in which the rotary table 12 is rotationally driven by the driven shaft 44 using a cam, such as a roller gear cam 48 provided on the driven shaft 44, and cam followers 8 that are provided on the rotary table 12. Modification examples of this are explained with reference to FIGS. 7 to 9.

Figure 7:
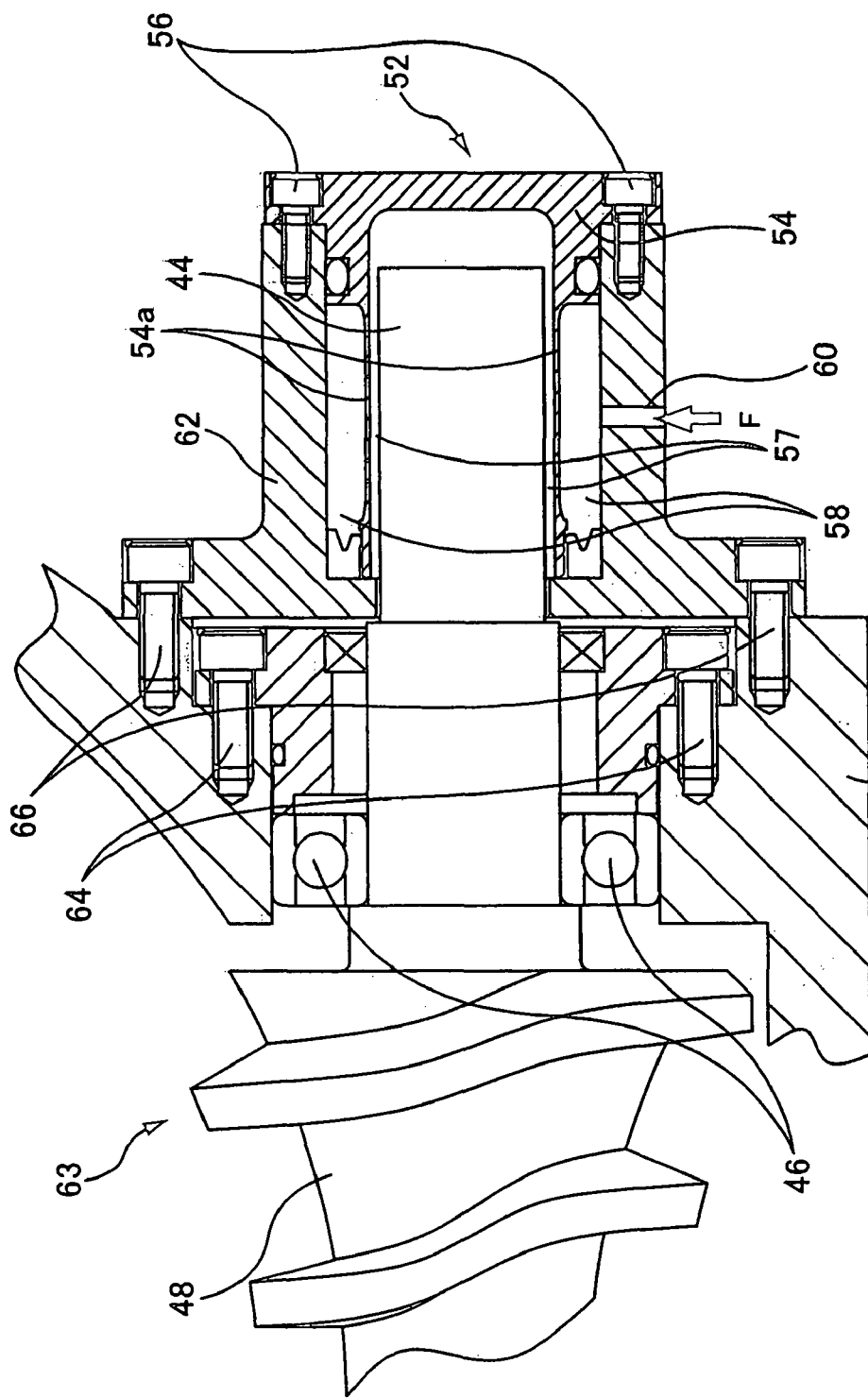
FIG. 7 is a diagram showing a rotary table apparatus 63 according to a first modification example.

First of all, a first modification example is explained with reference to FIG. 7. In the foregoing embodiment, the clamping device 52 is screwed with the pair of screws 42 to the housing 2, whereas in this first modification example, it is screwed to the housing 2 with two pairs of screws 64 and 66. Of these, the screws 66 can be easily attached and removed, so that the rotary table apparatus 63 of this first modification example has the advantage that the essential portions of the clamping device 52 can be easily attached to and removed from the housing 2. Also with this rotary table apparatus 63, by clamping the driven shaft 44 with the above-described clamping device 52, the driven shaft 44 can be properly clamped even when there are misalignments of the driven shaft 44 or the clamping device 52.

Figure 8A:
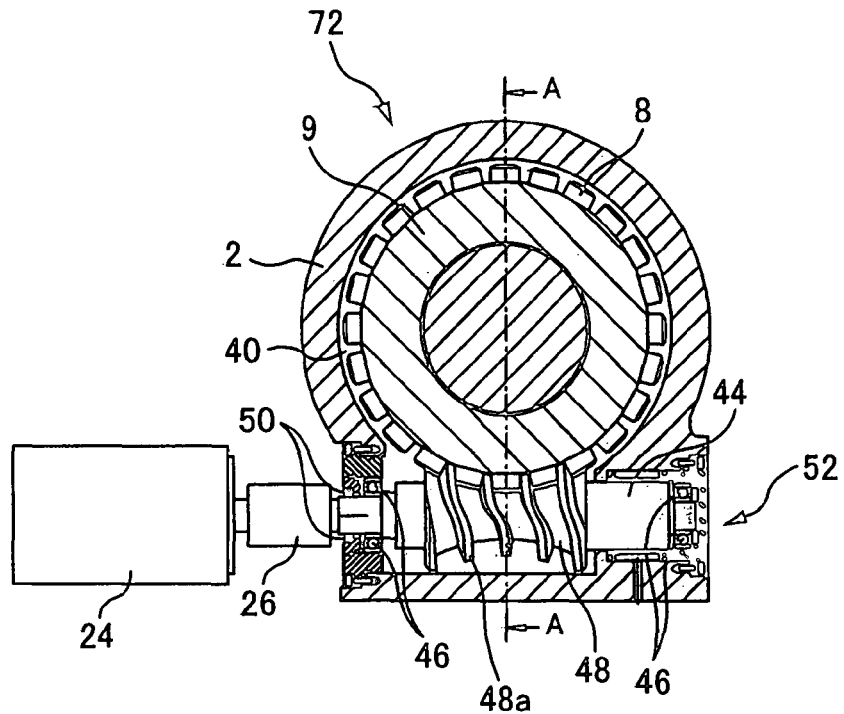
FIGS. 8A and 8B are diagrams showing a rotary table apparatus 72 according to a second modification example.
Figure 8B:
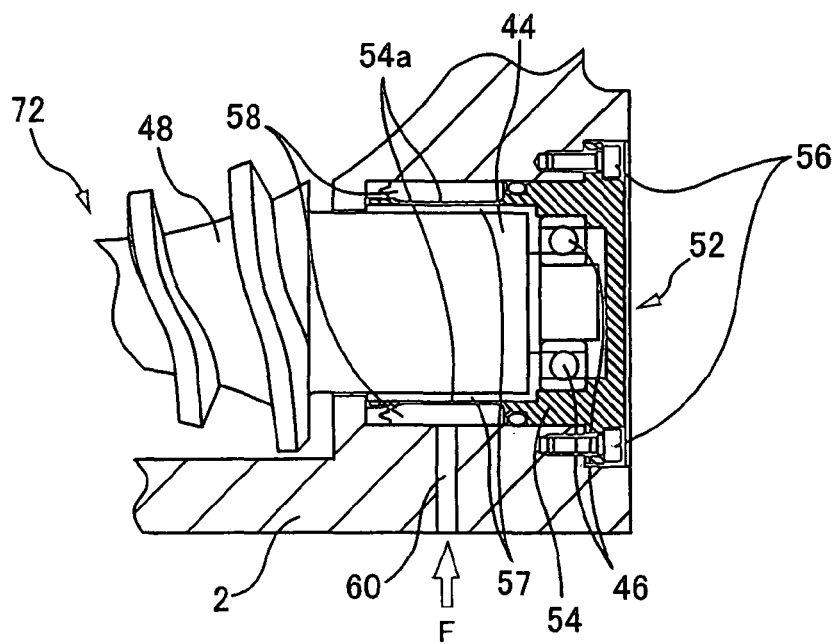

A second modification example is described with reference to FIGS. 8A and 8B. In this second modification example, the diameter of the driven shaft 44 of a rotary table apparatus 72 is larger than the diameter of the driven shaft 44 of the rotary table apparatus 10 according to the above-described embodiment. Thus, the rotary table apparatus 72 according to this second modification example has the advantage that the holding torque with which the clamping device 52 holds the driven shaft 44 can be increased. Moreover, because the diameter of the driven shaft 44 has been increased, the spatial arrangement is such that the ball bearing 46 for supporting the driven shaft 44 is arranged at a position that is different from the position of the ball bearing 46 of the rotary table apparatus 10 according to the above-described embodiment. Also with this rotary table apparatus 72, by clamping the driven shaft 44 with the above-described clamping device 52, the driven shaft 44 can be properly clamped even when there are misalignments of the driven shaft 44 or the clamping device 52.

Figure 9:
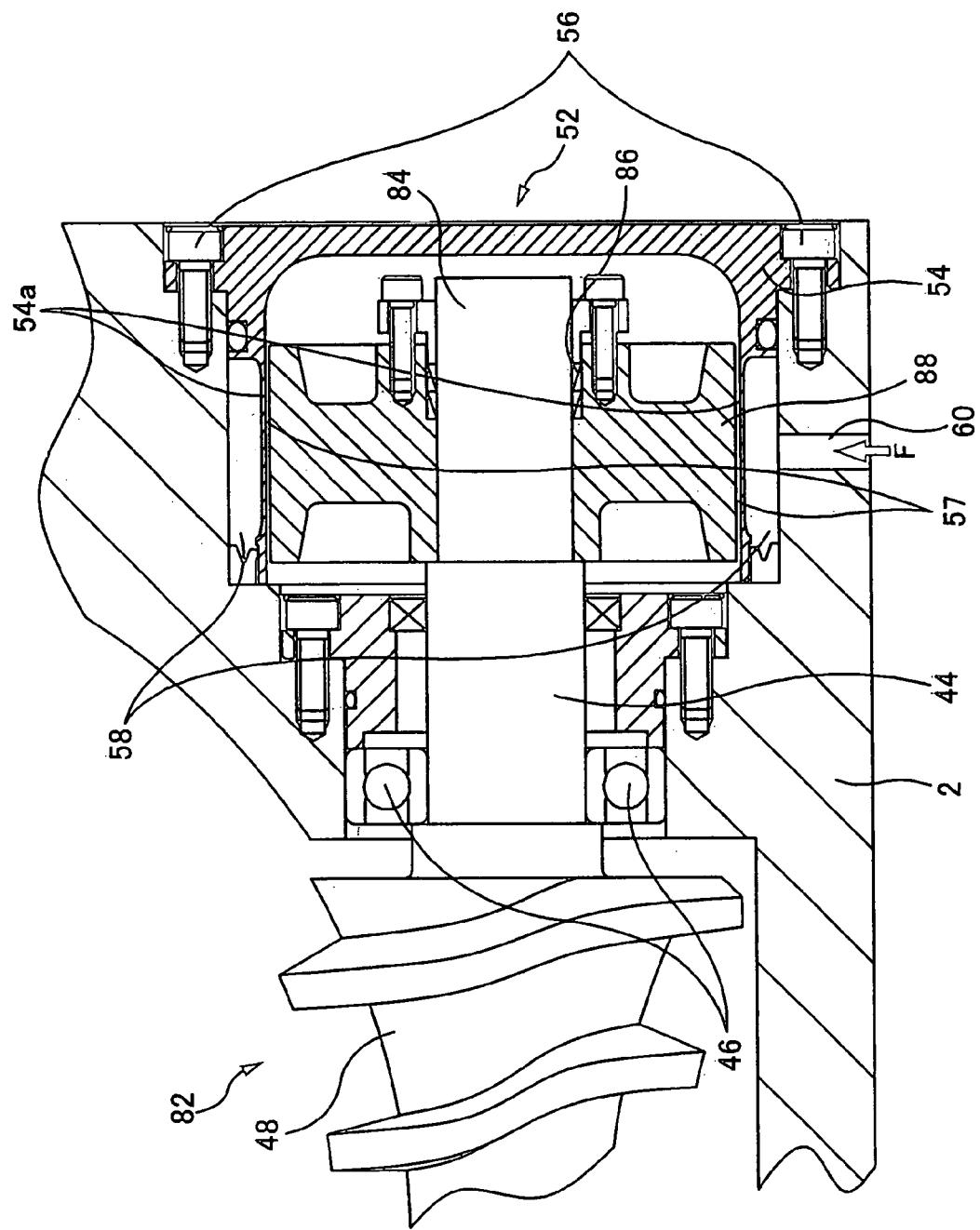
FIG. 9 is a diagram showing a rotary table apparatus 82 according to a third modification example.

Next, a third modification example is explained with reference to FIG. 9. In this third modification example, like in the second modification example, in order to increase the holding torque with which the clamping device 52 holds the driven shaft 44, the diameter of the driven shaft 44 of a rotary table apparatus 82 is made larger than the diameter of the driven shaft 44 of the rotary table apparatus 10 according to the above-described embodiment. However, whereas the large diameter portion of the driven shaft 44 of the rotary table apparatus 72 according to the second modification example was configured from a single member, the large diameter portion of the driven shaft 44 of the rotary table apparatus 82 according to the third modification example is made of two members. That is to say, the driven member 44 is made of a shaft section 84 having the same shape as the driven shaft of the rotary table apparatus 63 according to the first modification example, and a brake rotor 88 that is fastened by a fastening member 86 to the shaft section 84 in order to increase the diameter of the driven shaft 44. Also with this rotary table apparatus 82, by clamping the driven shaft 44 with the above-described clamping device 52, the driven shaft 44 can be properly clamped even when there are misalignments of the driven shaft 44 or the clamping device 52.

Moreover, in the foregoing embodiment, an example was explained in which the above-described clamping device 52 is applied to the driven shaft 44 of the rotary table apparatus 10, whose rotary table 12 is rotationally driven by the driven shaft 44 using a cam, such as the roller gear cam 48 provided on the driven shaft 44, and the cam followers 8 provided on the rotary table 12, but there is no limitation to this. For example, it is also possible to apply the above-described clamping device 52 to the driven shaft 44 of a rotary table apparatus 10 in which a worm wheel is attached to the rotary table 12, a worm gear meshes with this worm wheel, and the rotary table 12 is rotationally driven by the rotation of that worm gear.

Furthermore, in the foregoing embodiment, an example was explained in which the above-described clamping device 52 was applied to the driven shaft 44 of the rotary table apparatus 10 having a driven shaft 44 that is rotationally driven by a driving section such as the motor 24, and a rotary table 12 that is rotationally driven by the driven shaft 44. There is, however, no limitation to applying the clamping device 52 to the driven shaft 44 of the rotary table apparatus 10. For example, it is also possible to apply the above-described clamping device to the driven shaft of a moving member that is driven by the driven shaft, which is rotationally driven by a driving section such as a motor, and that moves on a base.

Figure 10:
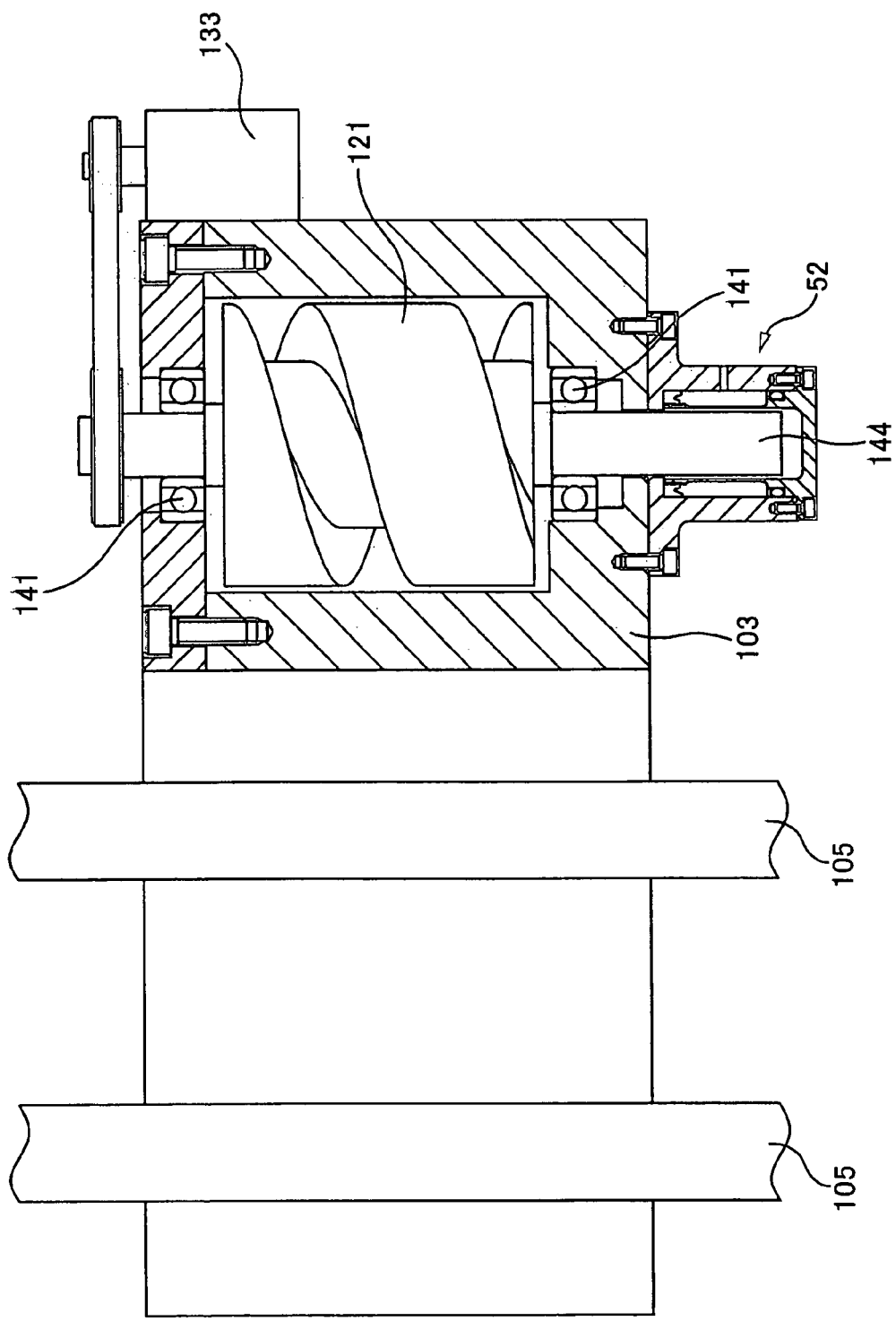
FIG. 10 is a top view of a moving member.
Figure 11:
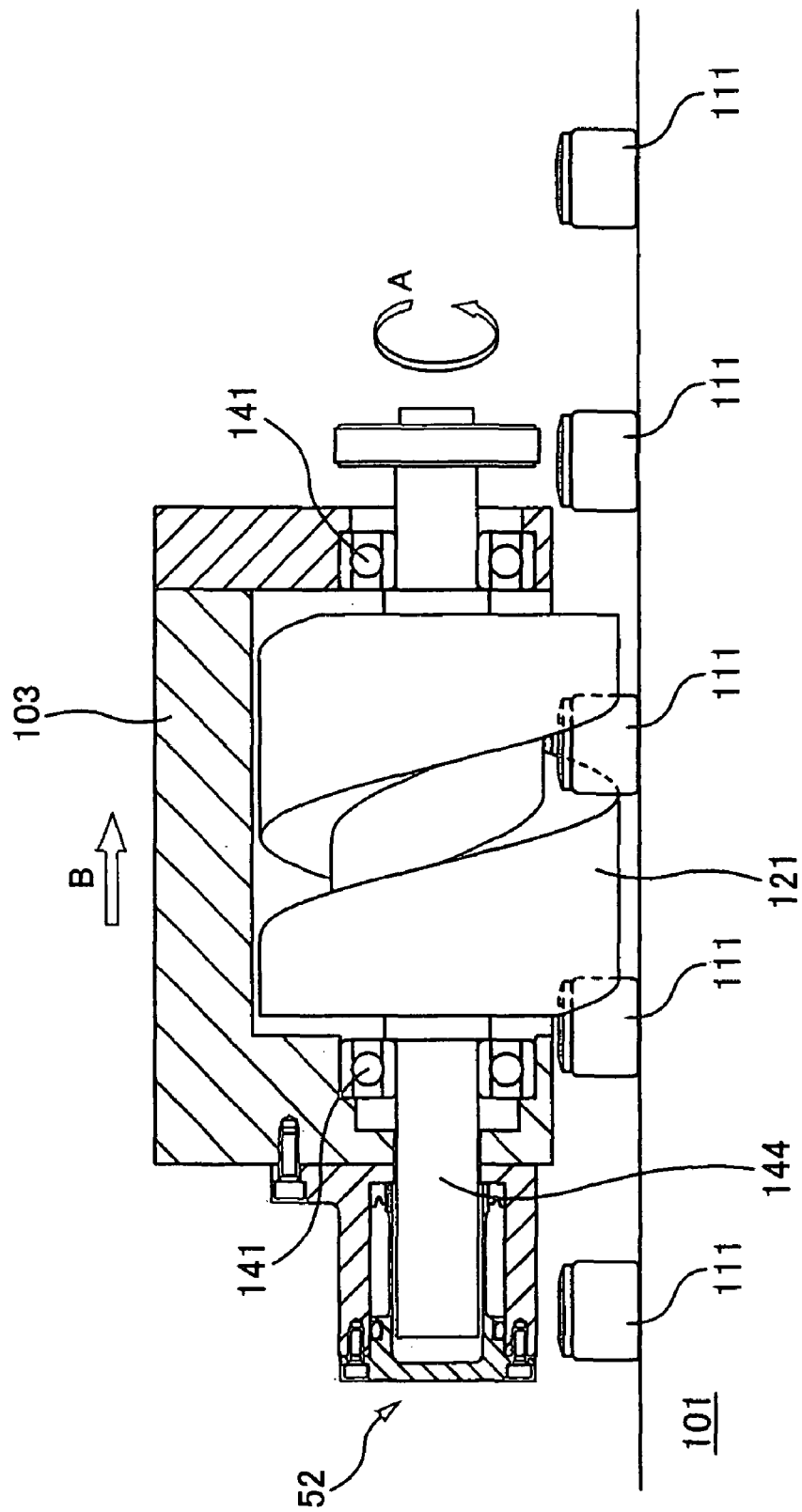
FIG. 11 is a front view of the moving member.

Such an example is explained with reference to FIGS. 10 and 11. FIG. 10 is a top view of such a moving member. FIG. 11 is a front view of the moving member.

This moving member 103 includes a motor 133, and a driven shaft 144 that is supported rotatively by ball bearings 141 and rotationally driven by the motor 133. Moreover, the driven shaft 144 is provided with a cylindrical cam 121. On the other hand, a base 101 includes a plurality of cam followers 111, which mesh with this cylindrical cam 121.

Here, when the driven shaft 144 is driven by the motor 133, the driven shaft 144 rotates (the rotation direction is marked by the letter A in FIG. 11). When the driven shaft 144 rotates, also the cylindrical cam 121 rotates, and the cam followers 111 are engaged by the cylindrical cam 121 one after the other. The base 101 is fixed, but the moving member 103 is configured to be movable, so that the moving member 103 moves linearly on the base 101, guided by guide members 105, while the cam followers 111 engage the cylindrical cam 121 one after the other (the moving direction is marked by the letter B in FIG. 11).

Furthermore, the moving member 103 is provided with the above-described clamping device 52, and when the moving member 103 is halted, the driven shaft 144 is clamped by the clamping device 52.

Also with this moving member 103, by clamping the driven shaft 144 with the above-described clamping device 52, the driven shaft 144 can be properly clamped even when there are misalignments of the driven shaft 144 or the clamping device 52.

Moreover, in all of the foregoing examples, the above-described clamping device 52 is applied to a driven shaft that is rotationally driven by a driving section such as a motor, but there is no limitation to this, and it is possible to apply the clamping device 52 to any shaft that is supported rotatably. For example, it is possible to apply the clamping device 52 to the rotation shaft of the rotary table 12 of the rotary table apparatus 10.

Furthermore, in the foregoing embodiment, the thin-walled sleeve 54a is positioned on the outer side in the radial direction of the driven shaft 44, and the driven shaft 44 is clamped by deforming the thin-walled sleeve 54a from the outer side in the radial direction toward the driven shaft 44, but there is no limitation to this. For example, the driven shaft may have a hollow shape, the thin-walled sleeve may be positioned on the inner side in the radial direction of this driven shaft, and the driven shaft may be clamped by deforming the thin-walled sleeve from the radially inward side towards the driven shaft.

However, the foregoing embodiment is more preferable in terms of making the configuration simple.

Moreover, the above-described embodiment, the fluid containing section 58 for containing a fluid is arranged on the outer side in the radial direction with respect to the thin-walled sleeve 54a, and the thin-walled sleeve 54a is deformed by the pressure of the fluid F filled into the fluid containing section 58, but there is no limitation to this. For example, the thin-walled sleeve may be configured with a piezo-electric element, and the thin-walled sleeve may be deformed by applying a voltage to this piezo-electric element.

However, the foregoing embodiment is more preferable in terms that the thin-walled sleeve can be deformed by a simple method.

In the foregoing embodiment, the thin-walled sleeve 54a is provided only on the inner side in the radial direction of the driven shaft 44 with respect to the fluid containing section 58, but there is no limitation to this. For example, it is also possible to arrange the thin-walled sleeve not only on the inner side in the radial direction of the driven shaft 44 with respect to the fluid containing section, but also on the outer side in the radial direction.

If a thin-walled sleeve is provided both on the inner side and the outer side in the radial direction of the driven shaft with respect to the fluid containing section, then the effect of the pressure of the fluid in the fluid containing section, that is, the effect of the pressure deforming the thin-walled sleeve, will be distributed between the thin-walled sleeve arranged on the radially inward side and the thin-walled sleeve arranged on the radially outward side. On the other hand, if the thin-walled sleeve 54a is provided only on the inner side in the radial direction of the driven shaft 44 with respect to the fluid containing section 58, then the effect of the pressure is concentrated on the thin-walled sleeve 54a, so that the thin-walled sleeve 54a can be efficiently deformed. In this respect, the foregoing embodiment is more preferable.

In the rotary table apparatus 10 according to the foregoing embodiment, there is no dwelling period in which the rotary table 12 is not rotationally driven even though the driven shaft 44 is being rotationally driven, but there is no limitation to this, and it is also possible to provide such a dwelling period.

If the rotary table apparatus 10 does not have such a dwelling period, then the driven shaft 44 will always be standing still when the rotary table 12 is positioned and standing still; therefore, the importance of the clamping device 52 for securely holding the rotary table 12 still by clamping the driven shaft 44 increases. Consequently, the above-described embodiment is more preferable in terms that the above-noted effect, that is, the effect that it is possible to properly clamp the driven shaft 44 even when there is a misalignment of the driven shaft 44 or the clamping device 52, can be achieved more appropriately.

It is further possible to introduce an oil into the gap 57 between the thin-walled sleeve 54a and the driven shaft 44, and to provide the surface of the driven shaft 44 with grooves for letting the oil flow when the driven shaft 44 is clamped by deforming the thin-walled sleeve 54a toward the driven shaft 44.

Figure 12:
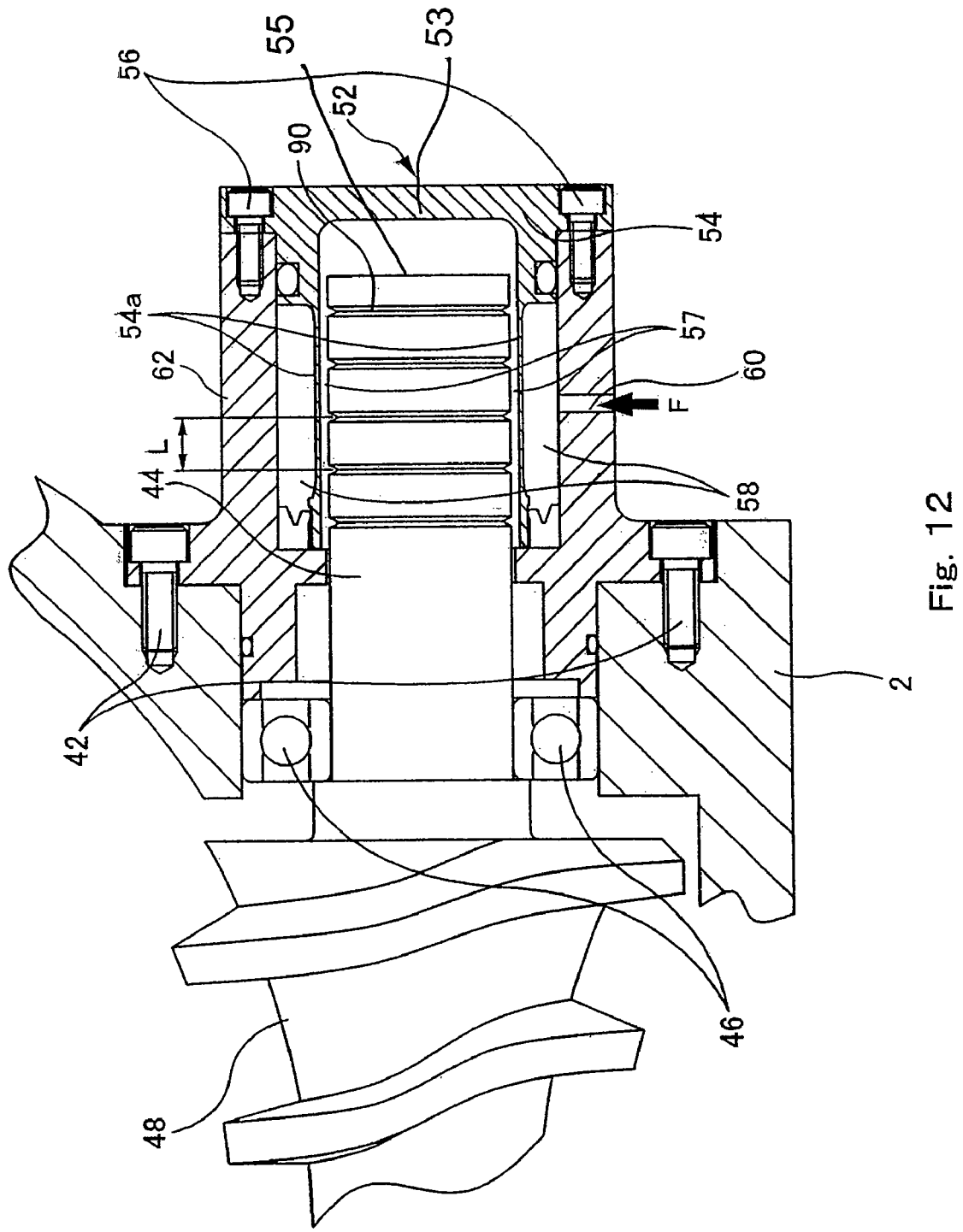
FIG. 12 is a diagram showing a portion of a rotary table apparatus including a driven shaft having grooves and a clamping device for clamping this driven shaft.
Figure 13:
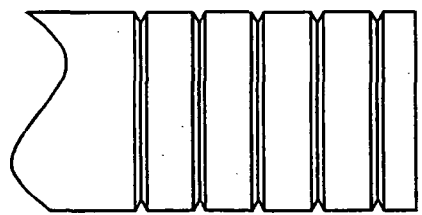
FIG. 13 is a diagram showing variations of groove shapes.
Figure 13:
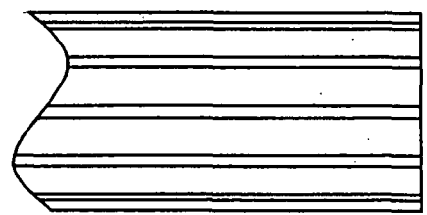
Figure 13:
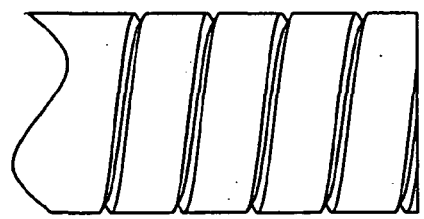
Figure 13:
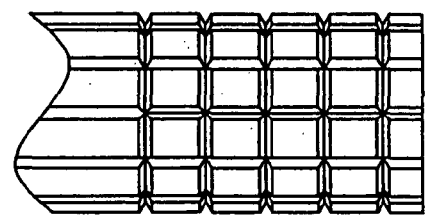
Figure 13:
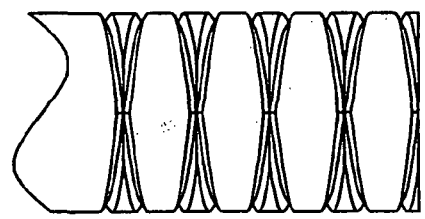
Figure 13:
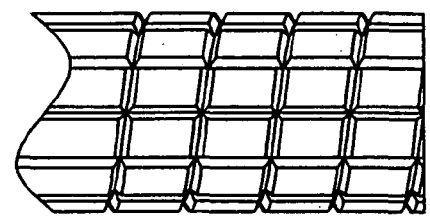
Figure 14:
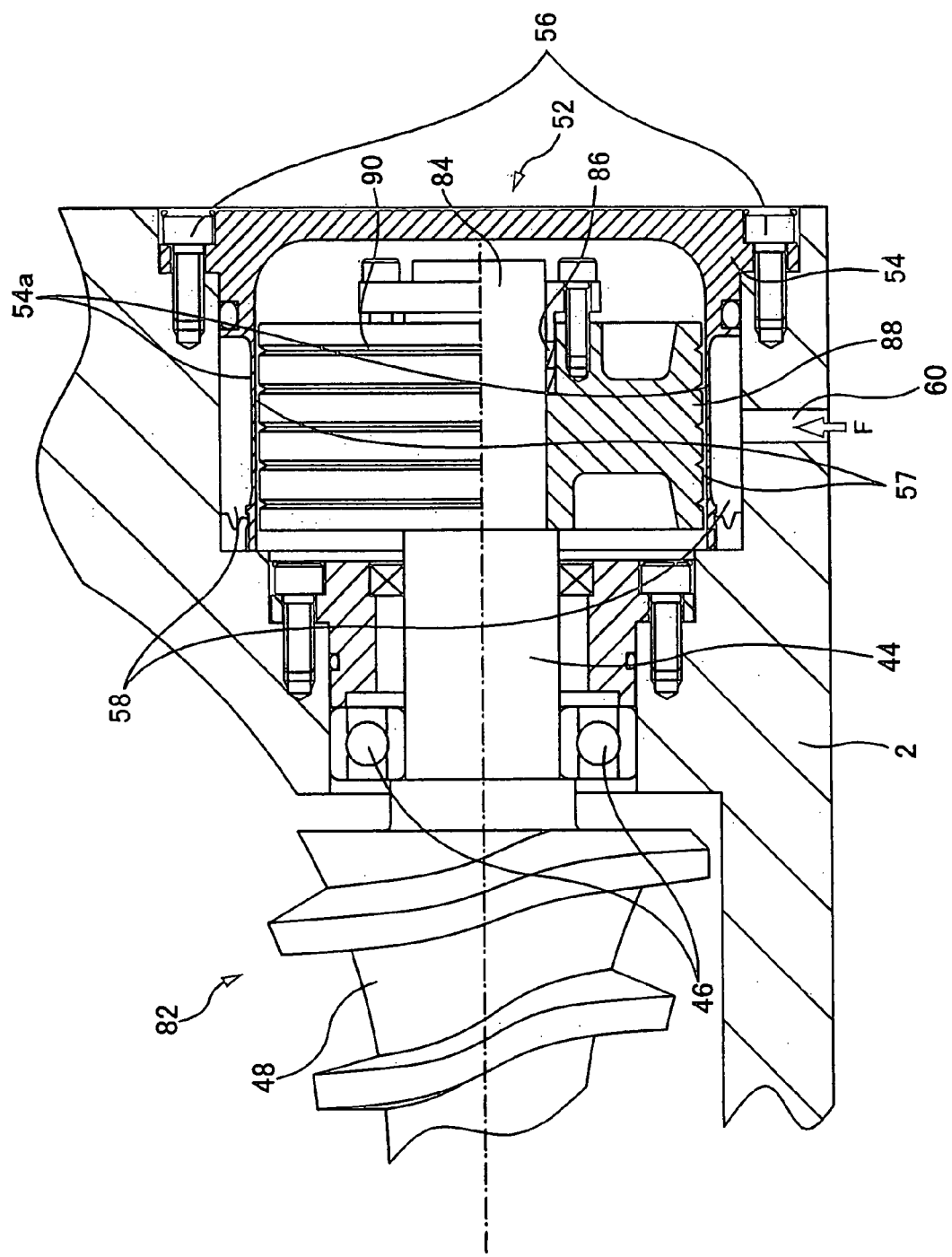
FIG. 14 is a diagram showing a portion of a rotary table apparatus including a driven shaft having grooves and a clamping device for clamping this driven shaft.

This aspect is explained in more detail with reference to FIGS. 12 to 14. FIGS. 12 and 14 are diagrams showing a portion of a rotary table apparatus including a driven shaft having grooves, and a clamping device for clamping the driven shaft. FIG. 12 corresponds to FIG. 3, and FIG. 14 corresponds to FIG. 9. FIG. 13 is a diagram showing variations of groove shapes.

First, attention is paid on FIG. 12. The rotary table apparatus 10 shown in FIG. 12 is different from the rotary table apparatus 10 shown in FIG. 3 in terms that the gap 57 between the thin-walled sleeve 54a and the driven shaft 44 is filled with an oil, and that grooves 90 are provided in the surface of the driven shaft 44, but otherwise, it has the same configuration as the rotary table apparatus 10 shown in FIG. 3. In this embodiment, the driven shaft 44 has a plurality of grooves 90, and each of the grooves 90 runs in the circumferential direction around the driven shaft 44. The clamping device 52 includes a bottom portion 53 that is integrated with the thin-walled sleeve, the bottom portion opposing an end surface 55 of the driven shaft 44.

With the rotary table apparatus 10 configured in this way, the driven shaft 44 is clamped by deforming the thin-walled sleeve 54a through the pressure of the fluid F that is filled into the fluid containing section 58, as explained above. When this happens, the gap 57 that was located between the thin-walled sleeve 54a and the driven shaft 44 disappears, and the oil in the gap 57 flows into the grooves 90 that are provided in the surface of the driven shaft 44.

In the following, the effect that is attained by providing oil in the gap 57 and arranging grooves 90 in the surface of the driven shaft 44 is explained. When the driven shaft 44 is clamped and a large rotation load is exerted on the driven shaft 44, there is a possibility that the driven shaft 44 and the thin-walled sleeve 54a may get locked due to the friction heat occurring between the driven shaft 44 and the thin-walled sleeve 54a. The oil fulfills the function of preventing the occurrence of such locking in the event that a large rotation load is exerted on the driven shaft 44. However, in ordinary situations, due to the effect of the oil provided in the gap 57, the driven shaft 44 and the thin-walled sleeve 54a are prone to slide against each other, and thus, there is the problem that a sufficient clamping capability cannot be attained.

In order to address this problem, grooves 90 are provided in the surface of the driven shaft 44. Thus, the oil in the gap 57 flows into the grooves 90 when the thin-walled sleeve 54a clamps the driven shaft 44, and slippage between the driven shaft 44 and the thin-walled sleeve 54a is prevented, thus solving the above-noted problem.

It should be noted that the interval in the axial direction of the driven shaft 44 between neighboring grooves 90, of among the plurality of grooves 90, (in FIG. 12, this interval is marked by the letter L) is most preferably at least 3 mm and at most 10 mm, in terms of ensuring a sufficient groove volume for properly allowing the oil in the gap 57 to flow in, and in terms of ensuring a sufficient area in the surface of the driven shaft 44 where no grooves 90 are provided, such that the clamping capability of the clamping device is not impaired.

Moreover, regarding the shape of the grooves 90, there is no limitation to the shape shown in FIG. 12, and for example, also the shapes shown in FIG. 13 are possible. Also, if the grooves 90 are provided in the driven shaft 44 according to the third modification example, then the grooves 90 are provided in the brake rotor 88, which constitutes the driven shaft 44 together with the shaft section 84 (see FIG. 14). Thus, it is possible to achieve the same effect also with the third modification example.

Although preferred embodiments of the present invention have been described, it should be understood that various changes, substitutions and alterations can be made therein without departing from spirit and scope of the invention as defined by the appended claims.

What is claimed is:

1. A rotary table apparatus comprising:
   a driven shaft that is misaligned in an axial direction and is rotationally driven by a driving section;
   a rotary table that is rotationally driven by said driven shaft; and
   a clamping device for clamping said driven shaft;
   wherein said clamping device includes a thin-walled sleeve arranged such that a gap that includes oil is provided along a circumferential direction of said driven shaft;
   wherein said clamping device clamps said driven shaft by deforming said thin-walled sleeve towards said driven shaft;

wherein a surface of said driven shaft is provided with a groove into which said oil flows when said clamping device clamps said driven shaft by deforming said thin-walled sleeve towards said driven shaft;

wherein a thickness of said thin-walled sleeve is 5 mm or less;

said thin-walled sleeve is made of metal;

said clamping device has a fluid containing section for containing a fluid, said fluid containing section being arranged on an outer side in a radial direction with respect to said thin-walled sleeve;

wherein an outer circumferential portion of said thin-walled sleeve is exposed to said fluid containing section, wherein said clamping device further includes a bottom portion that is integrated with said thin-walled sleeve, said bottom portion opposing an end surface of said driven shaft that is located inside said clamping device, wherein said outer circumferential portion and said bottom portion are monolithic, wherein, in said axial direction, a thickness of a middle portion of said thin-walled sleeve is smaller than a thickness of an end portion of said thin-walled sleeve, and wherein said clamping device clamps said driven shaft in a state maintaining a misalignment by making said thin-walled sleeve adapt to a shape of a circumferential surface of said driven shaft.

2. A rotary table apparatus according to claim 1,
wherein said driven shaft has a cam;
wherein said rotary table has a cam follower; and
wherein said rotary table is rotationally driven by said driven shaft using said cam and said cam follower.

3. A rotary table apparatus according to claim 2,
wherein said rotary table apparatus does not have a dwelling period in which said rotary table is not rotationally driven even though said driven shaft is being rotationally driven.

4. A rotary table apparatus according to claim 1,
wherein said thin-walled sleeve is positioned on an outer side in a radial direction of said driven shaft; and
wherein said clamping device clamps said driven shaft by deforming said thin-walled sleeve from said outer side in the radial direction towards said driven shaft.

5. A rotary table apparatus according to claim 1,
wherein said clamping device deforms said thin-walled sleeve by a pressure of the fluid that is filled into said fluid containing section.

* * * * *